United States Patent
Wakumoto

(10) Patent No.: US 8,213,430 B2
(45) Date of Patent: Jul. 3, 2012

(54) TRANSMITTING A PACKET FROM A DISTRIBUTED TRUNK SWITCH

(75) Inventor: Shaun Wakumoto, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 694 days.

(21) Appl. No.: 11/680,095

(22) Filed: Feb. 28, 2007

(65) Prior Publication Data
US 2008/0205408 A1   Aug. 28, 2008

(51) Int. Cl.
H04L 12/28   (2006.01)
(52) U.S. Cl. ........................................................ 370/392
(58) Field of Classification Search .................. None
See application file for complete search history.

(56) References Cited

U.S. PATENT DOCUMENTS

| | | | | |
|---|---|---|---|---|
| 5,923,654 | A * | 7/1999 | Schnell | 370/390 |
| 6,049,528 | A * | 4/2000 | Hendel et al. | 370/235 |
| 6,151,297 | A * | 11/2000 | Congdon et al. | 370/216 |
| 6,496,502 | B1 * | 12/2002 | Fite et al. | 370/389 |
| 6,804,233 | B1 * | 10/2004 | Congdon et al. | 370/389 |
| 6,807,179 | B1 * | 10/2004 | Kanuri et al. | 370/395.31 |
| 6,928,059 | B1 * | 8/2005 | Valentine et al. | 370/255 |
| 7,173,934 | B2 * | 2/2007 | Lapuh et al. | 370/392 |
| 7,251,217 | B2 * | 7/2007 | Wong et al. | 370/232 |
| 7,383,353 | B2 * | 6/2008 | Valdevit et al. | 709/241 |
| 7,447,198 | B1 * | 11/2008 | Banks et al. | 370/386 |
| 7,463,579 | B2 * | 12/2008 | Lapuh et al. | 370/216 |
| 7,633,883 | B2 * | 12/2009 | Cho et al. | 370/252 |
| 8,107,382 | B2 * | 1/2012 | Lin et al. | 370/244 |
| 2002/0141412 | A1 * | 10/2002 | Wong et al. | 370/392 |
| 2003/0097470 | A1 * | 5/2003 | Lapuh et al. | 709/239 |
| 2004/0024906 | A1 * | 2/2004 | Valdevit et al. | 709/241 |
| 2004/0037278 | A1 * | 2/2004 | Wong et al. | 370/389 |
| 2004/0133693 | A1 * | 7/2004 | Wils et al. | 709/230 |
| 2007/0171908 | A1 * | 7/2007 | Tillman et al. | 370/389 |
| 2007/0230357 | A1 * | 10/2007 | Lin et al. | 370/241.1 |

* cited by examiner

Primary Examiner — Ayaz Sheikh
Assistant Examiner — Faiyazkhan Ghafoerkhan

(57) ABSTRACT

A method of transmitting a packet from a distributed trunk switch and a computer-readable medium storing instructions therefor is described. The method comprises populating an address table of the distributed trunk switch. The method also comprises receiving a packet from a device connected to the distributed trunk switch and transmitting the received packet via a distributed trunk (DT) port of the distributed trunk switch if the destination address of the received packet corresponds to a distributed trunk port in the address table.

20 Claims, 7 Drawing Sheets

700

POPULATE ADDRESS TABLE OF ONE OF DT SWITCH PAIR BASED ON ADDRESS TABLE INFORMATION FROM THE OTHER OF THE DT SWITCH PAIR 702

RECEIVE PACKET AT NON-DT PORT OF ONE OF THE DT SWITCH PAIR WHEREIN THE RECEIVED PACKET IS DESTINED FOR A DEVICE CONNECTED VIA THE DISTRIBUTED TRUNK TO THE DT SWITCH PAIR 704

FORWARD THE RECEIVED PACKET TO A DT PORT OF THE ONE OF THE DT SWITCH PAIR WHICH RECEIVED THE PACKET AT THE NON-DT PORT BASED ON ADDRESS TABLE INFORMATION OF THE ONE OF THE DT SWITCH PAIR 706

COMPLETE 708

FIG. 7

TRANSMITTING A PACKET FROM A DISTRIBUTED TRUNK SWITCH

RELATED APPLICATION

The present application is related to co-pending application entitled, "Transmitting A Packet From A Distributed Trunk Switch," having assignee reference number 200603215-1, by the instant inventor, assigned to the same assignee, filed on the same date herewith, and is hereby incorporated by reference herein in its entirety.

BACKGROUND

Trunking enables the connection of two networked devices together using multiple links between the devices. Using multiple links provides for greater redundancy, e.g., if one of the links fails, the other link may be used. Additionally, multiple links may provide greater bandwidth between the devices and may provide load balancing over the connecting links.

FIG. 1 depicts a high-level block diagram of trunking in use connecting two devices, i.e., a first device 100 such as a switch or a server or other networked device, and a trunk switch 102 able to communicate over either link connecting the two devices. A pair of communication links 104, 106 communicatively connect device 100 and trunk switch 102 to each other. Communication links 104, 106 connect to trunk ports 108, 110, respectively, at trunk switch 102. The pair of communication links 104, 106 are collectively referred to as a trunk 112 (dashed line) connecting device 100 and trunk switch 102.

Assuming device 100 is a switch, FIG. 1 depicts two switches connected via a two-port trunk 112. Specifically, ports 114, 116 connect respectively to trunk ports 108, 110 of trunk switch 102 via links 104, 106. If a unicast packet, i.e., a packet sent from one device to one other device, was transmitted from trunk switch 102 to device 100, then trunk switch 102 selects a single link of 104, 106 over which to forward the packet to the device. If trunk switch 102 were to instead transmit the packet on both ports, then device 100 receives two copies of the same packet and forwards both copies thereby increasing, by duplication, the traffic on the network.

The selection of which port to use for forwarding packets is based on the traffic content. Trunk switch 102 performs a hash on several attributes within the particular packet to be forwarded. For example, trunk switch 102 may perform a logical XOR of the source and destination media access control (MAC) addresses and performs a modulus of the hash result based on the number of ports in the trunk, e.g., trunk 112.

A type of switch which forwards packets based on a MAC layer address is a layer 2 switch. A feature of a layer 2 switch is that the switch keeps track of the source MAC addresses of received packets and the particular port on which the packet is received. For example, if device 100 transmits traffic, e.g., a communication packet, to trunk switch 102 using link 104 (and port 108), the trunk switch tracks that the device is reachable via trunk (logical port) 112. Later transmissions received by trunk switch 102 which are destined for device 100 will be transmitted to the device by the trunk switch using logical port 112, i.e., one of ports 108, 110.

DESCRIPTION OF THE DRAWINGS

One or more embodiments of the present invention are illustrated by way of example, and not by limitation, in the figures of the accompanying drawings, wherein elements having the same reference numeral designations represent like elements throughout and wherein:

FIG. 7 is a high-level process flow diagram of a portion of another method according to an embodiment.

DETAILED DESCRIPTION

Figure 1:
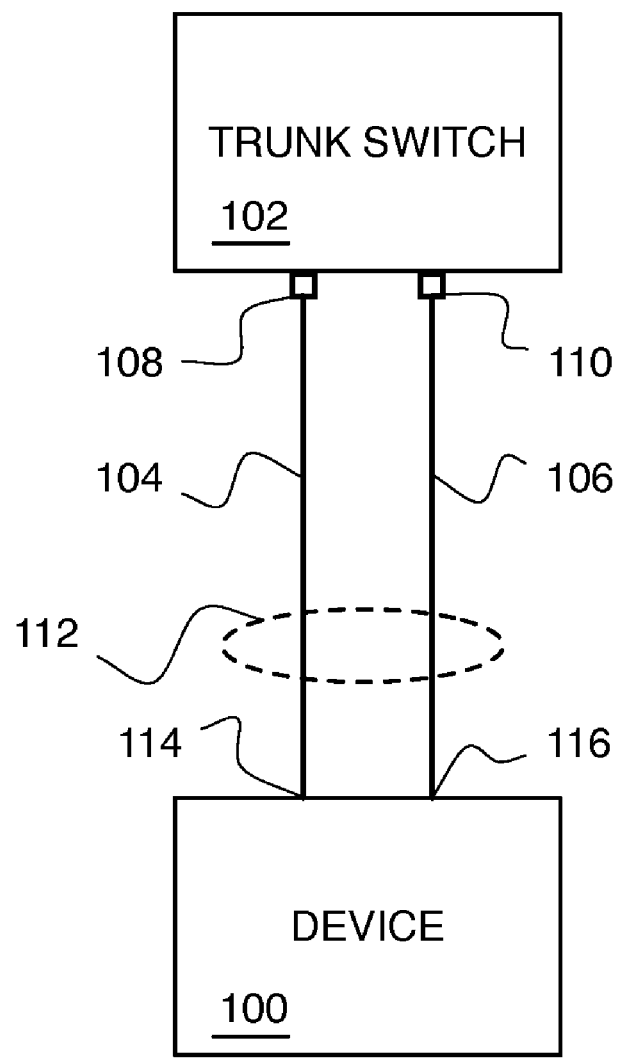
FIG. 1 is a high-level block diagram of trunking.
Figure 2:
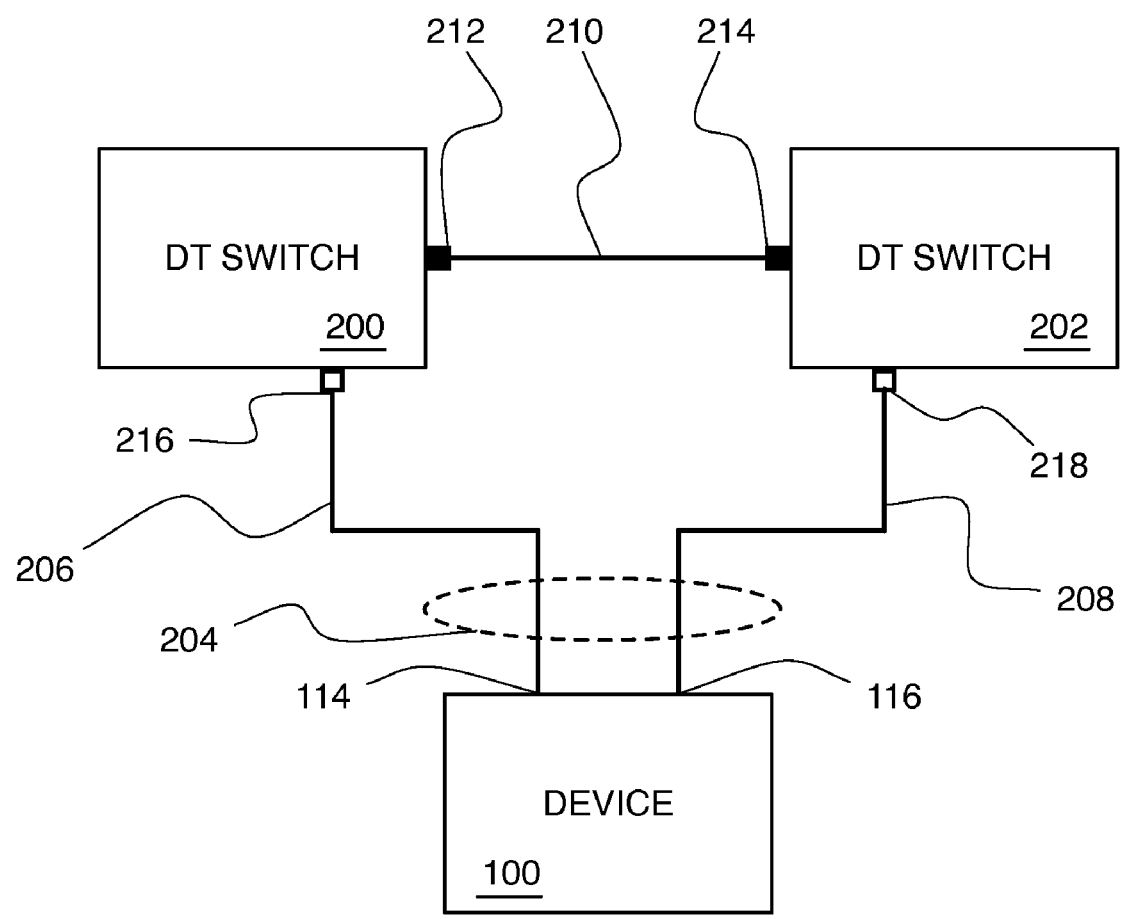
FIG. 2 is a high-level block diagram of distributed trunking according to an embodiment.

FIG. 2 depicts a particular embodiment of trunking referred to as distributed trunking (DT). Similar to the trunking described in connection with FIG. 1, DT refers to the use of port trunking to connect a single device to two DT-capable devices, e.g., switches. In this manner, a single device, e.g., device 100, connects via a DT to a first distributed trunk switch 200 and a second distributed trunk switch 202 using a distributed trunk 204 comprising links 206, 208. Distributed trunk 204 is referred to as a distributed trunk based on the distribution of links 206, 208 comprising the distributed trunk being distributed between two DT switches 200, 202. DT switches 200, 202 may be communicatively coupled with additional networked devices, e.g., switches, servers, etc. Device 100 may comprise a server and/or a switch or other networked device.

In some embodiments, device 100 is a switch connected with additional networked devices. In some embodiments, greater than two communication links may connect device 100 and DT switches 200, 202. In some further embodiments, greater than two DT switches 200, 202 may be connected with device 100 in a distributed trunking manner. In this manner, greater redundancy and/or greater bandwidth may be provided between device 100 and DT switches 200, 202. Further, if a single DT switch fails, the remaining DT switch is able to provide communication functionality for device 100.

FIG. 2 depicts DT switches 200, 202 communicatively connected with each other via communication link 210 (also referred to as a distributed trunk interconnect (DTI) link). Communication link 210 connects distributed trunk interconnect (DTI) port 212 of DT switch 200 with DTI port 214 of DT switch 202. Similarly, link 206 connects port 114 of device 100 to a DT port 216 of DT switch 200 and link 208 connects port 116 of the device to a DT port 218 of DT switch 202. DT switch 200 has designated DT port 216 as a distributed trunk port to indicate that communication received/sent via the port is communicated over distributed trunk 204 connected with device 100.

Using DT, device 100, e.g., a server, comprises two sets of links spanning two different switches 200, 202. DT enables device-level redundancy without requiring additional functionality on the device, e.g., device 100. In some embodiments, device 100 requires no additional drivers and/or functionality in order for the DT mechanism to operate. In particular, device 100 views the DT switches 200, 202 to which the device is connected as a single virtual switch in operation providing similar functionality to the device as in FIG. 1. DT additionally supports link aggregation control protocol (LACP) as the trunking protocol between device 100 and DT switches 200, 202. That is, DT switches 200, 202 appears as a single trunking device to device 100.

As depicted in FIG. 2, the term upstream forwarding refers to the transmission of communication packets from device 100 toward DT switches 200, 202 and the term downstream forwarding refers to the transmission of communication packets from the DT switches and above (top of page), e.g., additional devices connected with the DT switches, to the device.

In operation, DT switch 200 communicates with DT switch 202 via DTI link 210 using a predetermined DT communication protocol (DTCP). DTCP comprises communication of packets comprising information such as DT configuration information related to the configuration of DT 204, LACP attributes such as aggregator MAC address, priority, keys, transmission interval, etc., traffic hashing/algorithms used by DT switches 200, 202, master/slave negotiation information, and DT port speed, media type, etc.

Additionally, DT switches 200, 202 communicate over DTI link 210 to maintain knowledge of addresses, e.g., MAC addresses, of device 100 connected to DT ports, e.g., 216, 218. DT switch 200 informs DT switch 202 of addresses learned via DT port 216, and vice versa, with respect to DT switch 202 and DT port 218. Further, based on knowledge that both DT switches 200, 202 are distributed trunk connected to device 100 via DT ports 216, 218, if DT switch 200 learns of an address via DT port 216, the information may be relayed to DT switch 202 to enable DT switch 202 to add the learned address as corresponding to DT port 218 based on the fact that distributed trunk 204 is connected to device 100.

For example, assuming Table 1 comprises a table of addresses and ports corresponding to the addresses known to DT switch 200, if DT switch 200 receives a packet from device 100 via DT port 216, Table 1 appears as follows:

TABLE 1

| Address | Port |
|---|---|
| Device 100 | DT Port 216 |

After DT switch 200 "learns" of device 100 on DT port 216, the DT switch communicates the information to DT switch 202. In one embodiment, DT switch 200 transmits a signal to DT switch 202 indicating receipt of a packet from the address for device 100 over a DT port which is part of DT link 204 shared with DT switch 202. DT switch 202, by virtue of the knowledge that the information was received over DT link 204 stores the address of device 100 in a table, e.g., Table 2, comprising addresses and ports corresponding to the addresses known to DT switch 202, as follows:

TABLE 2

| Address | Port |
|---|---|
| Device 100 | DT Port 218 |

According to this embodiment, DT switches 200, 202 add additional addresses and ports to Tables 1 and 2 as further packets are received, e.g., from below device 100 and/or from above the DT switches.

In further operation, assuming DT switch 202 is configured as a slave switch with respect to DT switch 200, if DTI port 214 fails (DTI link 210 failure), then DT switch 200 disables the corresponding DT port 218. In some embodiments, disabling of DT port 218 may be performed via either bringing down the link 208 and/or via the LACP (if LACP is the trunking protocol in use).

In some embodiments, trunking may be used to comprise DTI link 210 between DT switches 200, 202, e.g., multiple communication links may make up the communicative coupling between the DT switches. According to this embodiment, each DT switch 200, 202 comprises one or more DTI ports connected to one or more corresponding communication links connecting the DT switches.

In at least one embodiment, each DT switch is paired with another DT switch, e.g., DT switches 200, 202. According to this embodiment, the paired DT switches may be DTI connected with each other without being paired to a third DT switch. One or more additional devices, e.g., device 100, may be connected to DT switches 200, 202 in a DT manner and/or via a network communication connection with one or the other of the DT switches.

In at least some embodiments, the DTI ports, e.g., DTI ports 212, 214 of the DT switches 200, 202, are members of the virtual local area networks (VLANs) configured for the DT switches. Broadcast, multicast, and destination look-up failure (DLF) packets received by one of the two DT switches are forwarded to the other of the two DT switches. If the particular packet is received on a non-DT port, i.e., traveling downstream toward device 100, then the packet is forwarded out one of the DT ports, i.e., DT port 216, 218, to device 100 over DT 204.

The present described embodiments provide feature interaction with a spanning tree protocol (STP) in order to provide additional redundancy. In order to operate with STP, DTI ports connecting DTI link 210 between DT switches 200, 202 are not blocked due to STP. In at least one embodiment, in order to avoid STP blocking of DTI ports, the port cost of DTI ports is set to the lowest value possible with respect to the STP. Further, as described above, downstream connections to DT switches 200, 202 looking toward device 100 view the DT switches as separate devices whereas the upstream connection from device 100 views the DT switches as a single trunked device similar to the configuration of FIG. 1. Further still, device 100 connected to DT switches 200, 202 is not allowed to execute STP. In at least one embodiment, a bridge protocol data unit (BPDU) blocker/filter is applied on DT ports 216, 218 via DT switches 200, 202 in order to prevent STP from executing with respect to the DT ports.

Figure 3:
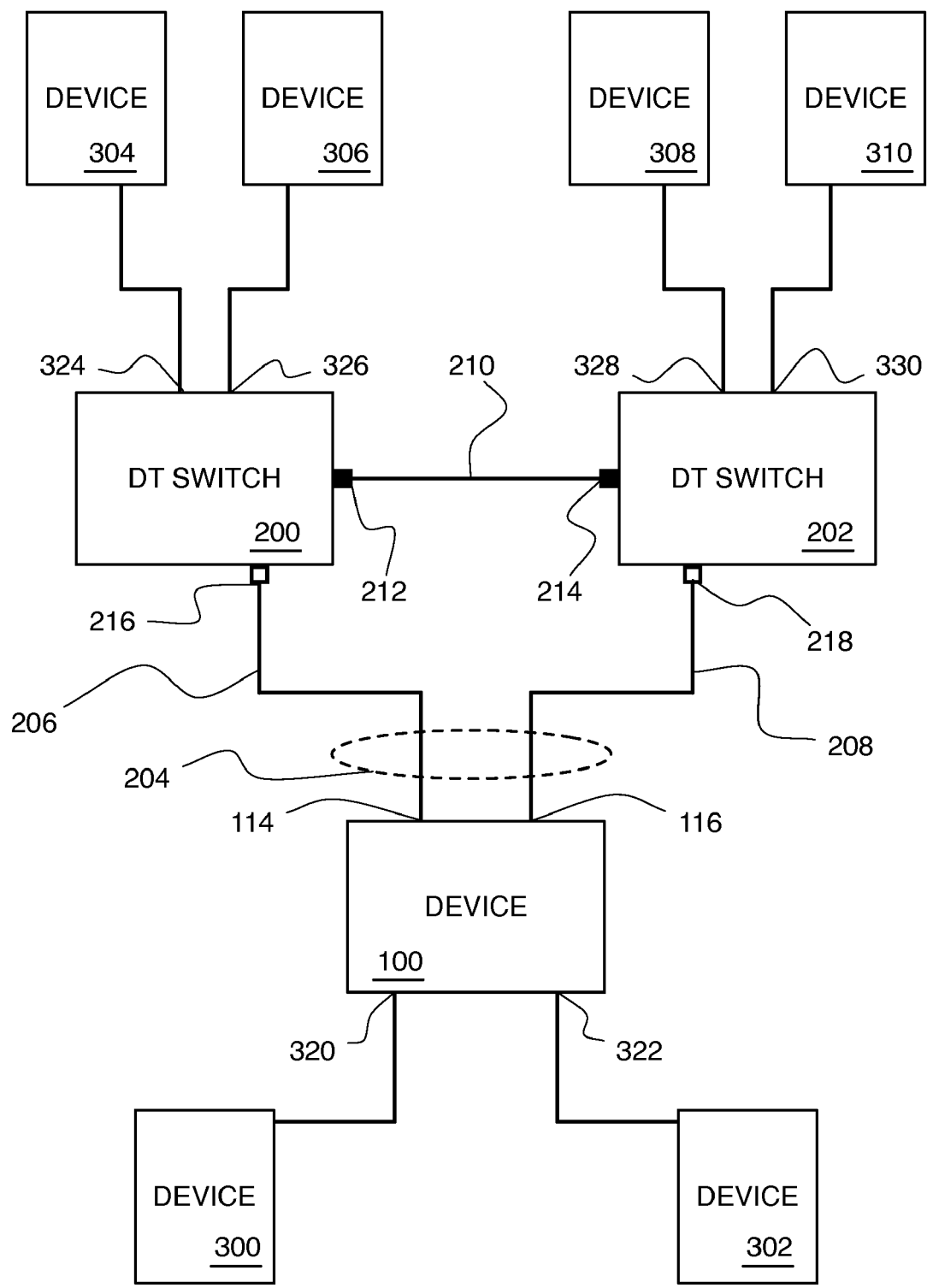
FIG. 3 is a high-level block diagram of distributed trunking according to another embodiment.

FIG. 3 depicts a high-level block diagram of DT switches 200, 202 connected in a distributed trunking manner as described in connection with FIG. 2 above and further comprising a pair of downstream devices 300, 302 communicatively coupled with device 100, e.g., a switch, and two pair of upstream devices 304, 306 and 308, 310 communicatively coupled with DT switches 200, 202, respectively. That is, device 100 operates as a switch with respect to devices 300, 302 and DT switches 200, 202 operate as switches with respect to devices 304, 306 and 308, 310, respectively.

Further specifically, devices 300, 302 connect with device 100 via ports 320, 322, respectively. Ports 320 and 322 are neither DT ports nor DTI ports (also referred to as non-DT ports). Devices 304 and 306 connect with DT switch 200 via ports 324, 326, respectively. Ports 324 and 326 are neither DT ports nor DTI ports of DT switch 200 (also referred to as non-DT ports). Similarly, devices 308 and 310 connect with DT switch 202 via ports 328 and 330, respectively. Ports 328 and 330 are neither DT ports nor DTI ports of DT switch 202.

In order to manage the transmission of received packets via the DT switches 200, 202, the DT switches (as referred to above) maintain a table of addresses corresponding to, for example, the source MAC address of a packet along with the port at the particular DT switch at which the packet is received. For example, DT switch 200 may receive packets from device 304 via port 324, from device 306 via port 326, from DT switch 202 via DTI port 212, and from device 100 via DT port 216. Additionally, DT switch 200 may receive packets from device 300 via DT port 216 and/or DTI port 212, depending on the algorithm used by device 100 in deciding the link of DT 204 to use to send the packet from device 300. Further, DT switch 200 may receive packets from devices 308, 310 via DTI port 212. Similar packet communication may be received by DT switch 202 from devices 300-310, device 100, and DT switch 200.

Figure 4:
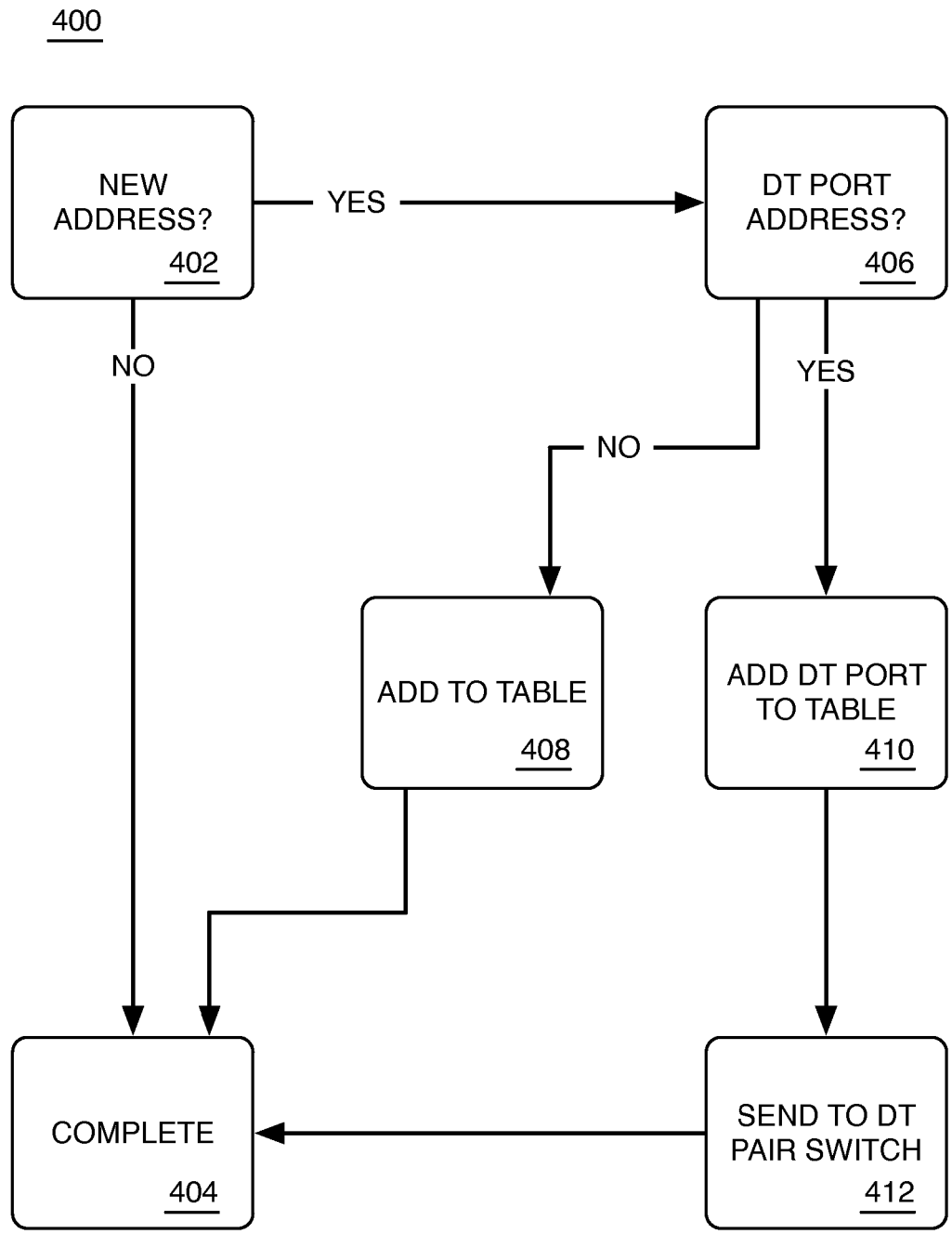
FIG. 4 is a high-level process flow diagram of a portion of a method according to an embodiment.

FIG. 4 depicts a high-level process flow diagram of a portion 400 of a method of maintaining the table for DT switch 200 based on receipt of a packet from a device. Execution of flow portion 400 by DT switch 200 causes the DT switch to evaluate received packet communication. After receipt of a packet, DT switch 200 executes new address functionality 402 and determines whether the received packet comprises a new source address, e.g., the DT switch performs a lookup of the address table for the source MAC address of the received packet.

If the result of new address functionality 402 is negative (NO), the flow proceeds to complete functionality 404 and DT switch 200 proceeds to transmit the received packet to the destination address, e.g., the destination MAC address specified in the packet based on the address table information. If the result of new address functionality 402 is positive (YES), the flow proceeds to DT port address functionality 406 and DT switch 200 determines whether the port on which the DT switch received the packet is a DT port, e.g., DT port 216.

If the result of DT port address functionality 406 is negative (NO), the flow proceeds to add to table functionality 408 and DT switch 200 adds the source address and port on which the received packet was received to address table. The flow then proceeds to complete functionality 404.

If the result of DT port address functionality 406 is positive (YES), the flow proceeds to add DT port to table functionality 410 and DT switch 200 adds the source address and DT port on which the received packet was received to address table. The flow then proceeds to send to DT pair switch 412 functionality 412 wherein DT switch 200 transmits the source address and an indicator that the source address was received via a DT port to DT switch 202 using the predetermined protocol over DTI link 210. The flow then proceeds to complete functionality 404.

Figure 5:
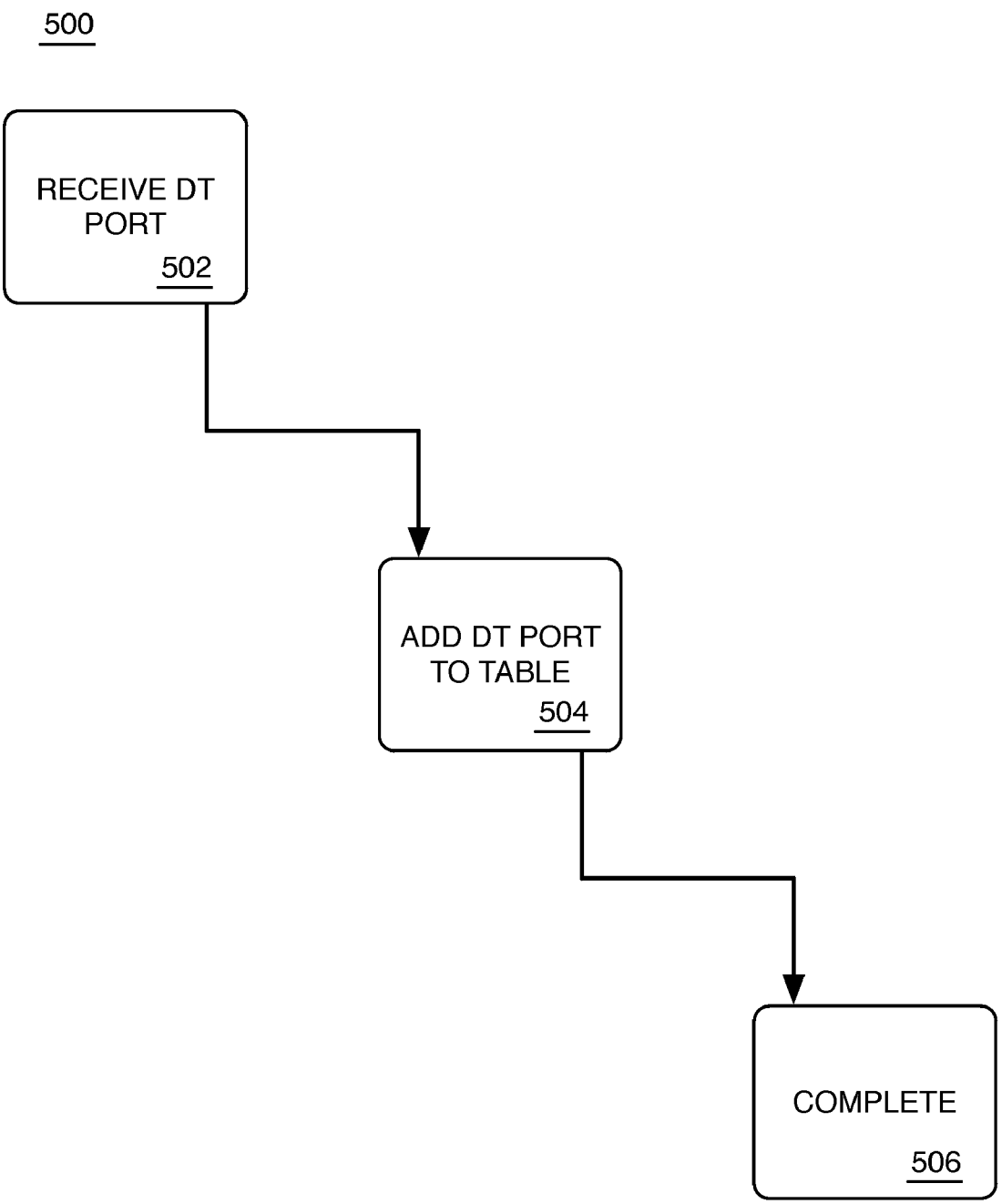
FIG. 5 is a high-level process flow diagram of another portion of a method according to an embodiment.

FIG. 5 depicts a high-level process flow diagram of a portion 500 of a method of maintaining the table for DT switch 202 based on receipt of DT port information from DT switch 200, e.g., via the predetermined protocol over DTI link 210. After receipt of DT port information from DT switch 200, DT switch 202 executes receive DT port functionality 502. The flow then proceeds to add DT port to table functionality 504 wherein DT switch 202 adds the source address, e.g., the source MAC address, and the DT port corresponding to link 208 of DT 204 to the address table of DT switch 202 along with an indication that the address is connected to a DT port, i.e., DT port 218. The flow then proceeds to complete functionality 506.

By DT switches 200, 202 executing the method portions 400, 500, the DT switches effectively ignore new source addresses received on DT ports and appearing on the DTI port 212, 214. Depending on the algorithm executed by device 100, the device may transmit a first packet having a destination of device 306 to DT switch 200 (via link 206) and the device may transmit a second packet having a destination of device 304 to DT switch 202 (via link 208). Without the above method portions 400, 500, DT switch 200 would switch the port in the address table assigned to device 100 from DT port 216 to DTI port 212. Assuming device 100 is a switch as depicted in FIG. 3, DT switch 200 may end up switching multiple address table entries for each device downstream of device 100. In at least one instance, repeated address switching may cause thrashing to occur on the DT switch.

In accordance with the method portions 400, 500, the DT switches 200, 202 do not switch address table entries for new source addresses received over DTI ports. The DT switches 200, 202 add an entry to the address table corresponding to receipt of DT port information from the other DT switch over the DTI link 210.

After transmission of packets of communication between the devices depicted in FIG. 3, the address table of DT switch 200 appears as follows:

TABLE 3

| Address | Port |
| --- | --- |
| Device 100 | DT port 216 |
| Device 300 | DT port 216 |
| Device 302 | DT port 216 |
| DT switch 202 | DTI port 212 |
| Device 304 | port 324 |
| Device 306 | port 326 |
| Device 308 | DTI port 212 |
| Device 310 | DTI port 212 |

The address table of DT switch 202 appears as follows:

TABLE 4

| Address | Port |
| --- | --- |
| Device 100 | DT port 218 |
| Device 300 | DT port 218 |
| Device 302 | DT port 218 |
| DT switch 200 | DTI port 214 |
| Device 304 | DTI port 214 |
| Device 306 | DTI port 214 |
| Device 308 | port 328 |
| Device 310 | port 330 |

In upstream transmission operation, DT switch 200 receives a packet from device 100 having a source address and a destination address. The destination address is to a device, e.g., 304, 306, 308, and 310, on the upstream side of DT switch 200. DT switch 200 determines to which port the destination address corresponds by reference to the address table maintained by the DT switch and transmits (forwards) the packet via the determined port.

In downstream transmission operation, DT switch 200 receives a packet, having a source address and a destination address, from an upstream device, e.g., 304, 306, 308, and 310. DT switch 200 determines to which port the destination address corresponds based on the address table maintained by the DT switch and transmits (forwards) the packet via the determined port.

Because of the distributed trunk 204 and DT switches 200, 202 maintaining knowledge of port addresses between the DT switches, a downstream transmission route may, in some embodiments, be shorter than the corresponding upstream transmission route. For example, based on the algorithm executed by device 100, an upstream route from device 300 may comprise transmission of a packet to device 100, from device 100 to DT switch 202 via link 208, from DT switch 202 to DT switch 200 via DTI link 210, from DT switch 200 to device 306. A downstream route from device 306, based on the address table information maintained between DT switches 200, 202, comprises transmission of a packet from device 306 to DT switch 200, from DT switch 200 to device 100 via DT link 206, and from device 100 to device 300. In this manner, at least one hop along the transmission route is removed.

Figure 6:
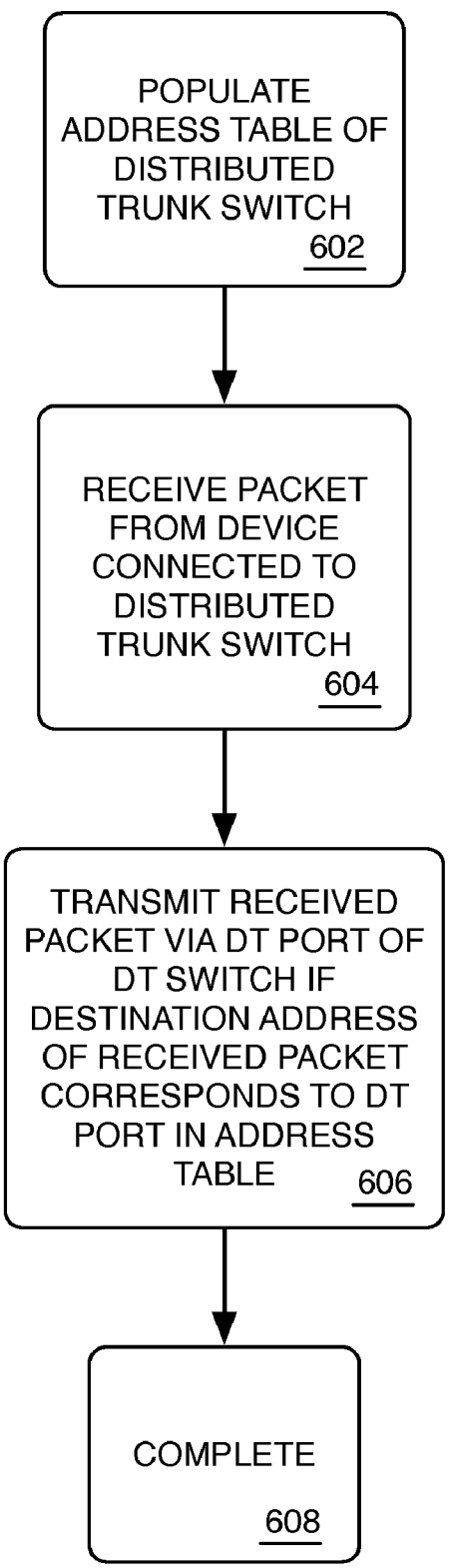
FIG. 6 is a high-level process flow diagram of a portion of another method according to an embodiment.

FIG. 6 depicts a high-level process flow diagram of a portion 600 of a method according to another embodiment wherein one of DT switches 200, 202 executes portion 600 upon receipt of a communication.

The process flow begins at populate functionality 602 wherein one of the DT switches 200, 202 populates an address table of the DT switch. The flow proceeds to receive packet functionality 604 wherein one of the DT switches 200, 202 receives a packet from a device connected to the DT switch.

The process flow proceeds to transmit functionality 606 wherein one of the DT switches 200, 202 transmits the received packet via a DT port of the DT switch if the destination address of the received packet corresponds to a DT port in the address table. The flow then proceeds to complete functionality 608.

FIG. 7 depicts a high-level process flow diagram of a portion 700 of a method according to another embodiment wherein one of DT switches 200, 202 executes portion 700 upon receipt of a communication.

The process flow begins at populate functionality 702 wherein one of the DT switches 200, 202 populates an address table of one of the DT switch pair based on address table information from the other of the DT switch pair.

The flow proceeds to receive packet functionality 704 wherein one of the DT switches 200, 202 receives a packet at a non-DT port of the DT switch pair wherein the received packet is destined for a device connected via the distributed trunk to the DT switch pair.

The flow proceeds to forward functionality 706 wherein one of the DT switches 200, 202 forwards the received packet to a DT port of the DT switch pair which received the packet at the non-DT port based on address table information of the one of the DT switch pair.

The flow proceeds to complete functionality 708.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

What is claimed is:

1. A method of transmitting a packet from a distributed trunk switch, comprising: populating an address table of the distributed trunk switch; receiving a packet from a device connected to the distributed trunk switch; transmitting the received packet via a distributed trunk (DT) port of the distributed trunk switch if the destination address of the received packet corresponds to a distributed trunk port in the address table; transmitting the received packet via a non-DT port of the distributed trunk switch if the destination address of the received packet corresponds to a non-DT port in the address table; and preventing spanning tree protocol (STP) from executing with respect to the DT port, while executing STP on the non-DT port.

2. The method as claimed in claim 1, wherein the populating comprises:
receiving information from another distributed trunk switch connected via a distributed trunk interconnect to the distributed trunk switch.

3. The method as claimed in claim 2, wherein the receiving information further comprises:
receiving information comprising a source address and a port identifier.

4. The method as claimed in claim 3, wherein the receiving information further comprises:
receiving a port identifier indicating whether the port related to the source address is a distributed trunk port.

5. The method as claimed in claim 1, wherein the preventing further comprises:
applying a bridge protocol data unit blocker/filter on the DT port to prevent the STP from executing with respect to the DT port.

6. The method as claimed in claim 1, further comprising:
transmitting the received packet via a distributed trunk interconnect port of the distributed trunk switch if the destination address of the received packet corresponds to a distributed trunk interconnect port in the address table.

7. The method as claimed in claim 6, wherein the populating comprises:
receiving information from another distributed trunk switch connected via a distributed trunk interconnect to the distributed trunk switch and the received information comprising an address and a port identifier indicating whether the port related to the source address is a DT port.

8. The method as claimed in claim 1, wherein the populating comprises:
receiving a packet from a non-DT port of the distributed trunk switch comprising an address; and
storing the address and a port identifier indicating that the port related to the address is a non-DT port.

9. The method as claimed in claim 1, wherein the receiving a packet comprises receiving a packet from a device connected to a non-DT port of the distributed trunk switch.

10. The method as claimed in claim 1, wherein the distributed trunk switch comprises one of at least two DT devices in a distributed trunk, the distributed trunk comprising links of a single trunk from a device distributed among the at least two DT devices and further comprising a distributed trunk interconnect comprising a single link between the at least two DT devices.

11. A method of forwarding a packet received by a non-DT port of one of a distributed trunk switch pair connected via a distributed trunk to a device, comprising: populating an address table of one of the distributed trunk switch pair based on address table information from the other of the distributed trunk switch pair; receiving a packet at a non-DT port of one of the distributed trunk switch pair, wherein the received packet is destined for a device connected via the distributed trunk to the distributed trunk switch pair; forwarding the received packet to a DT port of the one of the distributed trunk switch pair which received the packet at the non-DT port based on address table information of the one of the distributed trunk switch pair; and preventing spanning tree protocol (STP) from executing with respect to the DT port, while executing STP on the non-DT port.

12. The method as claimed in claim 11, wherein the populating an address table comprises populating an address table based on an address and a port identifier.

13. The method as claimed in claim 12, wherein the port identifier comprises at least one of a non-DT port, a DT port, and a distributed trunk interconnect port.

14. The method as claimed in claim 11, wherein the preventing further comprises:
applying a bridge protocol data unit blocker/filter on the DT port to prevent the STP from executing with respect to the DT port.

15. A non-transitory computer-readable medium storing instructions which, when executed by a processor, cause the processor to populate an address table of a distributed trunk switch, to receive a packet from a device connected to the distributed trunk switch, to transmit the received packet via a distributed trunk port of the distributed trunk switch if a destination address of the received packet corresponds to a distributed trunk port in the address table; and to prevent spanning tree protocol (STP) from executing with respect to the DT port, while executing STP on the non-DT port.

16. The computer-readable medium as claimed in claim 15, wherein the computer-readable medium further comprises instructions which, when executed by the processor, cause the processor to receive information from another distributed trunk switch connected via a distributed trunk interconnect to the distributed trunk switch.

17. The computer-readable medium as claimed in claim 15, wherein the computer-readable medium further comprises instructions which, when executed by the processor, cause the processor to transmit the received packet via a distributed trunk interconnect port of the distributed trunk switch if the destination address of the received packet corresponds to a distributed trunk interconnect port in the address table.

18. The computer-readable medium as claimed in claim 15, wherein the computer-readable medium further comprise instructions which, when executed by the processor, cause the processor to transmit the received packet via a non-DT port of the distributed trunk switch if the destination address of the received packet corresponds to a non-DT port in the address table.

19. The computer-readable medium as claimed in claim 15, wherein the computer-readable medium further comprise instructions which, when executed by the processor, cause the processor to receive a packet from a non-DT port of the distributed trunk switch comprising an address; and store the address and a port identifier indicating that the port related to the address is a non-DT port.

20. The computer-readable medium as claimed in claim 15, wherein the computer-readable medium further comprises instructions which, when executed by the processor, cause the processor to apply a bridge protocol data unit blocker/filter on the DT port to prevent the STP from executing with respect to the DT port.

* * * * *